United States Patent
Valkenburg et al.

(10) Patent No.: US 8,625,854 B2
(45) Date of Patent: Jan. 7, 2014

(54) 3D SCENE SCANNER AND A POSITION AND ORIENTATION SYSTEM

(75) Inventors: Robert Jan Valkenburg, Auckland (NZ); David William Penman, Auckland (NZ); Johann August Schoonees, Auckland (NZ); Nawar Sami Alwesh, Auckland (NZ); George Terry Palmer, Auckland (NZ)

(73) Assignee: Industrial Research Limited, Lower Hutt (NZ)

( * ) Notice: Subject to any disclaimer, the term of this patent is extended or adjusted under 35 U.S.C. 154(b) by 1119 days.

(21) Appl. No.: 12/066,108

(22) PCT Filed: Sep. 8, 2006

(86) PCT No.: PCT/NZ2006/000237
§ 371 (c)(1),
(2), (4) Date: Sep. 14, 2009

(87) PCT Pub. No.: WO2007/030026
PCT Pub. Date: Mar. 15, 2007

(65) Prior Publication Data
US 2009/0323121 A1 Dec. 31, 2009

Related U.S. Application Data

(60) Provisional application No. 60/715,769, filed on Sep. 9, 2005.

(51) Int. Cl.
*G06K 9/00* (2006.01)

(52) U.S. Cl.
USPC ............................................ 382/106; 382/107

(58) Field of Classification Search
None
See application file for complete search history.

(56) References Cited

U.S. PATENT DOCUMENTS

| 4,670,648 A | 6/1987 | Hall et al. |
| 4,714,339 A | 12/1987 | Lau et al. |

(Continued)

FOREIGN PATENT DOCUMENTS

| GB | 2 328 280 | 2/1999 |
| WO | 92/07233 | 4/1992 |

(Continued)

OTHER PUBLICATIONS

SE Stephen et al, "Instant Scene Modeler for Crime Scene Reconstruction", IEEE Computer Society, Washington, DC, Proceedings of the 2005 IEEE Computer Society Conference on Computer Vision and Pattern Recognition (CVPR '05)—Workshops—vol. 03, 2005, ISBN—ISSN: 1063-6919, 0-7695-2372-2-3.

(Continued)

*Primary Examiner* — Nancy Bitar
(74) *Attorney, Agent, or Firm* — Dann, Dorfman, Herrell and Skillman, P.C.

(57) ABSTRACT

A hand-held mobile 3D scanner (10) for scanning a scene. The scanner (10) comprises a range sensor (11) that is arranged to sense the location of surface points in the scene relative to the scanner (10) and generate representative location information, a texture sensor (12) that is arranged to sense the texture of each surface point in the scan of the scene and generate representative texture information, and a position and orientation sensor (13) that is arranged to sense the position and orientation of the scanner (10) during the scan of the scene and generate representative position and orientation information. A control system (14) is also provided that is arranged to receive the information from each of the sensors and generate data representing the scan of the scene.

19 Claims, 8 Drawing Sheets

(56) References Cited

U.S. PATENT DOCUMENTS

| | | |
|---|---|---|
| 4,973,156 A | 11/1990 | Dainis |
| 5,198,877 A | 3/1993 | Schulz |
| 5,422,715 A | 6/1995 | Clarke |
| 5,525,883 A | 6/1996 | Avitzour |
| 5,530,549 A | 6/1996 | Brown |
| 5,699,444 A | 12/1997 | Palm |
| 5,729,475 A | 3/1998 | Romanik, Jr. |
| 5,832,139 A | 11/1998 | Batterman et al. |
| 5,856,844 A | 1/1999 | Batterman et al. |
| 5,870,136 A | 2/1999 | Fuchs et al. |
| 5,884,239 A | 3/1999 | Romanik, Jr. |
| 5,969,822 A | 10/1999 | Fright et al. |
| 5,973,788 A | 10/1999 | Pettersen et al. |
| 5,988,862 A | 11/1999 | Kacyra et al. |
| 6,028,955 A | 2/2000 | Cohen et al. |
| 6,064,749 A | 5/2000 | Hirota et al. |
| 6,166,809 A | 12/2000 | Pettersen et al. |
| 6,222,937 B1 | 4/2001 | Cohen et al. |
| 6,266,142 B1 | 7/2001 | Junkins et al. |
| 6,559,935 B1 | 5/2003 | Tew |
| 6,587,783 B2 | 7/2003 | Navab et al. |
| 6,611,141 B1 | 8/2003 | Schulz et al. |
| 6,697,761 B2 | 2/2004 | Akatsuka et al. |
| 6,724,930 B1 | 4/2004 | Kosaka et al. |
| 6,734,849 B2 | 5/2004 | Dimsdale et al. |
| 6,747,260 B2 | 6/2004 | Miramonti et al. |
| 6,764,185 B1 * | 7/2004 | Beardsley et al. ............ 353/122 |
| 6,770,863 B2 * | 8/2004 | Walley ......................... 250/221 |
| 6,787,750 B1 | 9/2004 | Sauer |
| 7,301,547 B2 * | 11/2007 | Martins et al. ................ 345/633 |
| 7,412,113 B2 * | 8/2008 | Morichika et al. ............ 382/289 |
| 7,583,275 B2 * | 9/2009 | Neumann et al. ............. 345/633 |
| 2003/0012410 A1 | 1/2003 | Navab et al. |
| 2003/0025788 A1 * | 2/2003 | Beardsley ....................... 348/43 |
| 2003/0076980 A1 | 4/2003 | Zhang et al. |
| 2003/0076996 A1 | 4/2003 | Neumann et al. |
| 2003/0112448 A1 | 6/2003 | Maidhof et al. |
| 2004/0001647 A1 | 1/2004 | Lake et al. |
| 2004/0051711 A1 | 3/2004 | Dimsdale et al. |
| 2004/0233461 A1 | 11/2004 | Armstrong et al. |

FOREIGN PATENT DOCUMENTS

| | | | |
|---|---|---|---|
| WO | 00/30337 | | 5/2000 |
| WO | WO0030337 | * | 5/2000 |
| WO | 03/029921 | | 4/2003 |

OTHER PUBLICATIONS

R. J. Valkenburg et al, "Self-Calibration of Target Positions using Geometric Algebra", Image and Vision Computing New Zealand, Nov. 2004, pp. 221-226.

International Search Report, dated Dec. 20, 2006, of International Patent Application PCT/NZ2006/000237.

* cited by examiner

3D SCENE SCANNER AND A POSITION AND ORIENTATION SYSTEM

CROSS REFERENCE TO RELATED APPLICATION

This application claims the benefit of U.S. Provisional Application No. 60/715,769, filed Sep. 9, 2005, the entirety of which is incorporated herein by reference.

FIELD OF THE INVENTION

The present specification relates to a three-dimensional (3D) scene scanner for scanning a scene. In particular, although not exclusively, the scanner can be utilised to capture data for generating 3D photo-realistic representations or 3D computer models of static objects or environments over wide areas, whether outdoor or indoor. The present specification also relates to an associated position and orientation system.

BACKGROUND TO THE INVENTION

Various types of 3D scanners are available, each more suited to specific applications, e.g. for scanning small objects with high resolution or for scanning large objects with low resolution. To scan all around an object requires that either the object is moved past the scanner, e.g. on a turntable, or the scanner moved around the object.

Several types of known scanners are capable of capturing complete surface information of objects and scenes. Generally, these scanners can be separated into three categories: namely photogrammetric scanners, fixed station laser scanners and hand-held 3D shape scanners. The scanners generate data points or other structures representing the scene or object scanned and this data can be post-processed by software to allow visualisation and to generate 3D representations or 3D computer models of the scene or object.

Photogrammetric systems reconstruct a 3D scene or object based on analysis of multiple overlapping 2D images. Provided common features are visible and identified in the images and camera calibration parameters are known or determined, it is possible to extract 3D metric scene or object information. In some cases, the cameras are pre-calibrated. In other cases, self-calibration is attempted based on the image matches.

Fixed station scanners scan a scene from a fixed location. Typically, fixed station scanners are arranged to scan a modulated laser beam in two dimensions and acquire range information by measuring the phase-shift of the reflected modulated laser light or the time-of-flight of a reflected laser pulse. By panning the scanner through 360°, it is possible to produce a 360° panoramic range map of the scene. To scan a complete scene often requires moving the fixed station scanner to a number of different scanning locations. Depending on the size of scene, scanning time is typically 10-30 minutes. Some fixed station scanners also comprise a digital camera that is arranged to capture colour information for each surface point in the scan of the scene so that dual colour and range images can be generated. Other fixed station scanners incorporate multiple lasers to allow acquisition of colour as well as range information.

Hand-held 3D shape scanners comprise a hand-held mobile scanner-head that is commonly maneuvered by a user about the object being scanned. Typically, the scanner-head includes a range sensor for determining the local shape of the object by sensing the position in space of the surface points of the object relative to the scanner-head. For example, the range sensor may sense the position in space of the surface points via laser triangulation. The hand-held 3D shape scanners also comprise a position and orientation system that measures the position and orientation of the mobile scanner-head in space during the scan. The local shape information is then coupled with the scanner-head position and orientation information to enable a 3D computer model of the object to be constructed.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide a flexible and portable 3D scene scanner that is capable of scanning wide-area scenes, or to provide a position and orientation system that is capable of sensing the pose of a mobile object in 6D, or to at least provide the public with a useful choice.

SUMMARY OF THE INVENTION

In a first aspect, the present invention broadly consists in a hand-held mobile 3D scanner for scanning a scene comprising: a range sensor that is arranged to sense the location of surface points in the scene relative to the scanner and generate representative location information; a texture sensor that is arranged to sense the texture of each surface point in the scan of the scene and generate representative texture information; a position and orientation sensor that is arranged to sense the position and orientation of the scanner during the scan of the scene and generate representative position and orientation information; and a control system that is arranged to receive the information from each of the sensors and generate data representing the scan of the scene.

Preferably, the data generated relates to scanned surface points in the scene and may comprise information on the 3D positions of those surface points in space and texture information in relation to those surface points. More preferably, the data may further comprise viewpoint information in relation to the viewpoint from which the surface points were scanned by the scanner.

Preferably, the control system may be arranged to generate the texture information for the data based on texture values sensed by the texture sensor from multiple viewpoints during the scan.

Preferably, the control system may be arranged to generate a texture model representing the scan of the scene.

Preferably, the data generated by the control system may be in the form of rich-3D data.

Preferably, the control system may be arranged to generate a 3D substantially photo-realistic representation of the scene from the data.

Preferably, the control system may comprise a user interface that is operable by a user to control scanning parameters.

Preferably, the control system may comprise an output display that is arranged to generate a progressive representation of the scene as it is being scanned.

Preferably, the control system may be arranged to filter out data associated with scanned surface points in the scene that fall outside scanning zones that are selected by the user.

Preferably, the control system may be arranged to increase or decrease the resolution of the range and texture sensors for particular scanning zones that are selected by the user.

Preferably, the range sensor may comprise any one of the following: a light detection and ranging (LIDAR) device, triangulation-based device, or a non-scanning time-of-flight camera device.

In one form, the texture sensor may comprise a colour camera that is arranged to capture digital images of the scene, each digital image comprising an array of pixels and each pixel or group of pixels corresponding to a surface point in the scan of the scene from which texture information can be extracted. In an alternative form, the texture sensor may comprise a multi-spectral laser imager that is arranged to sense texture information relating to the scanned surface points of the scene.

In one form, the position and orientation sensor may comprise an optical tracking device that senses the position and orientation of the scanner by tracking visible reference targets located about the scene. Preferably, the optical tracking device may comprise one or more direction sensors that are arranged to detect visible reference targets and generate direction information relating to the direction of the visible reference targets relative to the scanner, the optical tracking device processing the direction information to determine the position and orientation of the scanner. More preferably, the direction sensors may be optical sensors that are each arranged to view outwardly relative to the scanner to provide direction information relating to any visible reference targets.

The position and orientation sensor may additionally comprise an inertial sensor that is arranged to sense the position and orientation of the scanner and provide representative position and orientation information if the optical tracking device experiences target dropout.

In a second aspect, the present invention broadly consists in a portable 3D scanning system for scanning a scene comprising: a hand-held mobile scanner comprising: a range sensor that is arranged to sense the location of surface points in the scene relative to the scanner and generate representative location information; a texture sensor that is arranged to sense the texture of each surface point in the scan of the scene and generate representative texture information; and a position and orientation sensor that is arranged to sense the position and orientation of the scanner during the scan of the scene and generate representative position and orientation information; multiple reference targets for placing randomly about the scene, the position and orientation sensor interacting with detectable reference targets to sense the position and orientation of the scanner; and a control system that is arranged to control the scanner and its sensors and the reference targets, receive the information from each of the sensors, and generate data representing the scan of the scene.

Preferably, the data generated relates to scanned surface points in the scene and may comprise information on the 3D positions of those surface points in space and texture information in relation to those surface points. More preferably, the data may further comprise viewpoint information in relation to the viewpoint from which the surface points were scanned by the scanner.

Preferably, the control system may be arranged to generate the texture information for the data based on texture values sensed by the texture sensor from multiple viewpoints during the scan.

Preferably, the control system may be arranged to generate a texture model representing the scan of the scene.

Preferably, the data generated by the control system may be in the form of rich-3D data.

Preferably, the control system may be arranged to generate a 3D substantially photo-realistic representation of the scene from the data.

Preferably, the control system may comprise a user interface that is operable by a user to control scanning parameters.

Preferably, the control system may comprise an associated output display that is arranged to generate a progressive representation of the scene as it is being scanned.

Preferably, the control system may be arranged to filter out data associated with scanned surface points in the scene that fall outside scanning zones that are selected by the user.

Preferably, the control system may be arranged to increase or decrease the resolution of the range and texture sensors for particular scanning zones that are selected by the user.

Preferably, the range sensor may comprise any one of the following: a light detection and ranging (LIDAR) device, triangulation-based device, or a non-scanning time-of-flight camera device.

In one form, the texture sensor may comprise a colour camera that is arranged to capture digital images of the scene, each digital image comprising an array of pixels and each pixel or group of pixels corresponding to a surface point in the scan of the scene from which texture information can be extracted. In another form, the texture sensor may comprise a multi-spectral laser imager that is arranged to sense texture information relating to the scanned surface points of the scene.

In one form, the position and orientation sensor may comprise an optical tracking device that senses the position and orientation of the scanner by tracking visible reference targets located about the scene. Preferably, the optical tracking device may comprise one or more direction sensors that are arranged to detect visible reference targets and generate direction information relating to the direction of the visible reference targets relative to the scanner, the optical tracking device processing the direction information to determine the position and orientation of the scanner. More preferably, the direction sensors may be optical sensors that are each arranged to view outwardly relative to the scanner to provide direction information relating to any visible reference targets.

In one form, the position and orientation sensor may additionally comprise an inertial sensor that is arranged to sense the position and orientation of the scanner and provide representative position and orientation information if the optical tracking device experiences target dropout.

In a third aspect, the present invention broadly consists in a method of scanning a scene comprising the steps of: operating a hand-held mobile scanner to scan the scene, the scanner comprising: a range sensor that is arranged to sense the shape of the object(s) in the scene on a surface point-by-point basis and generate representative shape information; a texture sensor that is arranged to sense the texture of the object(s) in the scene on a surface point-by-point basis and generate representative texture information; and a position and orientation sensor that is arranged to sense the position and orientation of the scanner in a local reference frame and generate representative position and orientation information; obtaining the shape, texture, and position and orientation information from the sensors; processing the shape, texture, and position and orientation information; and generating data representing the scan of the scene.

Preferably, the step of processing the shape, texture, and position and orientation information may comprise extracting information about each surface point of the surfaces and objects in the scan on a point-by-point basis by computing the 3D position of each surface point in the local reference frame from the shape information and the position and orientation information; generating the texture information around the region of each surface point from the texture information from the texture sensor and the position and orientation information; and extracting the viewpoint from which the surface point was scanned by the scanner from the position and orientation information.

Preferably, the step of generating data representing the scene may comprise constructing rich-3D data.

Preferably, the method may further comprise the step of processing the data to generate a 3D substantially photorealistic representation of the scene for display.

Preferably, the method may further comprise the step of placing reference targets about the scene and operating the position and orientation sensor of the scanner to interact with detectable reference targets to sense the position and orientation of the scanner in the local reference frame.

Preferably, the step of operating the hand-held mobile scanner to scan the scene may comprise scanning the surfaces and objects of the scene from multiple viewpoints.

Preferably, the step of operating the hand-held mobile scanner to scan the scene may comprise first initially setting scanning zones within the scene such that processing step discards any information relating to surface points of objects in the scene that fall outside the scanning zones.

In a fourth aspect, the present invention broadly consists in a mobile 3D scene scanner for scanning a scene comprising: a range sensor arranged to sense the shape of the object(s) in the scene on a surface point-by-point basis and generate representative shape information; a texture sensor arranged to sense the texture of the object(s) in the scene on a surface point-by-point basis and generate representative texture information; a position and orientation sensor arranged to sense the position and orientation of the scanner in a local reference frame and generate representative position and orientation information; and a control system arranged to control each of the sensors, receive the information from each of the sensors, and generate data representing the surface points of the object(s) scanned in the scene.

Preferably, the data generated by the control system may be in the form of rich-3D data.

Preferably, the range sensor may comprise any one of the following: a light detection and ranging (LIDAR) device, triangulation-based device, or a non-scanning time-of-flight camera device.

In one form, the texture sensor may comprise a colour camera that is arranged to capture digital images of the scene, each digital image comprising an array of pixels and each pixel or group of pixels corresponding to a surface point of an object in the scan of the scene from which texture information can be extracted. In another form, the texture sensor may comprise a multi-spectral laser imager that is arranged to sense texture information relating to the object(s) in the scene on a surface point-by-point basis.

In a fifth aspect, the present invention broadly consists in a position and orientation system for sensing the position and orientation of a mobile object that is moveable in an environment comprising: multiple reference targets locatable in random positions within the environment to define a local reference frame; an optical tracking device mounted to the mobile object comprising one or more direction sensors that are arranged to detect visible reference targets and generate direction information relating to the direction of the visible reference targets relative to the optical tracking device; and a control system arranged to operate the optical tracking device, receive the direction information, process the direction information, and generate position and orientation information relating to the position and orientation of the mobile object in the local reference frame.

Preferably, the direction sensors of the optical tracking device may be optical sensors that are each arranged to view outwardly relative to the scanner to provide direction information relating to any visible reference targets. More preferably, the optical sensors may comprise an arrangement of cameras that view outwardly relative to the mobile object to provide direction information relating to any visible reference targets.

Preferably, the one or more direction sensors of the optical tracking device may be arranged to form an omnidirectional direction sensor.

Preferably, the reference targets may each comprise a switchable light source that is arranged to emit light for sensing by the direction sensors of the optical tracking device.

Preferably, the control system is arranged to auto-calibrate in operation by automatically determining the 3D position of visible reference targets in the environment by processing direction information from the optical tracking device. More preferably, the control system may be arranged to auto-calibrate at start-up and continue to periodically auto-calibrate during operation to register the movement, removal, and addition of reference targets to the environment.

Preferably, the control system may be arranged to provide the user with feedback on the quality of the distribution of the reference targets within the environment after auto-calibration has taken place, the distribution of the reference targets affecting the accuracy of the position and orientation information generated.

Preferably, the control system may comprise a user interface that is operable by a user to control the system and an associated output display for presenting the position and orientation information.

Preferably, the position and orientation system may further comprise an inertial sensor that is arranged to sense the position and orientation of the mobile object and provide representative position and orientation information if the optical tracking device experiences target dropout.

In a sixth aspect, the present invention broadly consists in a method of sensing the position and orientation of a mobile object that is moveable in an environment comprising the steps of: placing multiple reference targets at random positions within the environment to define a local reference frame; mounting an optical tracking device to the mobile object, the optical tracking device comprising one or more direction sensors that are arranged to detect visible reference targets and generate direction information relating to the direction of the visible reference targets relative to the optical tracking device; operating the optical tracking device to track and sense visible reference targets as it moves with the mobile object in the environment and generate direction information; and processing the direction information to generate position and orientation information relating to the position and orientation of the mobile object in the local reference frame.

Preferably, the step operating the optical tracking device to track and sense visible reference targets may further comprise the step of operating the optical tracking device to initially determine the 3D position of visible reference targets in the environment by auto-calibrating from the direction information.

Preferably, the step of auto-calibrating may comprise: moving the mobile object into N locations in the environment and sensing direction information for visible reference targets at each location; calculating initial estimates of the position and orientation of the mobile object at the N locations; calculating accurate estimates of the position and orientation of the mobile object; and reconstructing the reference target 3D positions by triangulation using the direction information and the accurate estimates of the position and orientation of the mobile object. In one form, the step of calculating initial estimates may comprise executing a closed form algorithm. In one form, the step of calculating accurate estimates may comprise executing a non-linear minimisation algorithm.

Preferably, the step of auto-calibrating occurs periodically to register the movement, removal, and addition of reference targets.

Preferably, the method of sensing the position and orientation of a mobile object may further comprise the step of feeding back information on the quality of the distribution of the reference targets within the environment after auto-calibration step has taken place, the distribution of the reference targets affecting the accuracy of the position and orientation information generated.

Preferably, the step of processing the direction information to generate position and orientation information may comprise: calculating an initial estimate of the position and orientation of the mobile object using a boot-strapping process; predicting the current position and orientation of the mobile object based on previous position and orientation estimate; associating the sensed direction information with specific individual reference target 3D positions; and updating the current position and orientation prediction using the individual reference target 3D positions and direction information. In one form, the step of predicting the current position and orientation of the mobile object may comprise extrapolating from the previous position and orientation estimate. In one form, the step of updating the current position and orientation predication may comprise executing a non-linear algorithm.

Preferably, the method of sensing the position and orientation of a mobile object may further comprise mounting an inertial sensor to the mobile object and operating the inertial sensor to sense the position and orientation of the mobile object and generate representative position and orientation information if the optical tracking device experiences target dropout.

In this specification and the accompanying claims, the term "texture" is intended to cover any information relating to the surface texture including, but not limited to, colour, such as hue, brightness and saturation, or grey-scale intensity information.

In this specification and the accompanying claims, the term "scene" is intended to cover any indoor or outdoor environment, surfaces and objects together within such environments, and also individual objects in isolation within such environments.

In this specification and the accompanying claims, the term "portable" in the context of a system is intended to cover any system that has components that may be packed into a carry-case or that are relatively easily transportable to different locations.

Unless the context requires otherwise, the term "targets" in this specification and the accompanying claims is intended to cover any powered or non-powered object, device, marker, landmark, beacon, pattern or the like.

In this specification and the accompanying claims, the phrase "visible reference targets" is intended to cover reference targets that are visible to the optical tracking device of the position and orientation system in that the targets are able to be sensed and not occluded.

In this specification and the accompanying claims, the phrase "surface points" is intended to refer to the points or patches on the surface of objects and surroundings within a scene being scanned.

In this specification and the accompanying claims, the phrase "rich-3D data" is intended to capture 3D point cloud data in which each surface point or patch has associated viewpoint information and texture values obtained from different viewpoints or an associated texture model constructed from texture information sensed from multiple viewpoints during the scan for that surface point or patch.

The term 'comprising' as used in this specification and claims means 'consisting at least in part of', that is to say when interpreting statements in this specification and claims which include that term, the features, prefaced by that term in each statement, all need to be present but other features can also be present.

The invention consists in the foregoing and also envisages constructions of which the following gives examples only.

BRIEF DESCRIPTION OF THE DRAWINGS

Preferred embodiments of the 3D scene scanner and the position and orientation system will be described by way of example only and with reference to the drawings, in which.

DETAILED DESCRIPTION OF PREFERRED EMBODIMENTS

The preferred form 3D scene scanner is a hand-held device for flexibly scanning and capturing data for generating 3D photo-realistic representations or 3D computer models of static objects or environments. In one form, the 3D scene scanner is operable to capture data for creating 3D photographs of scenes, environments and objects, whether located indoor or outdoor.

Figure 1:
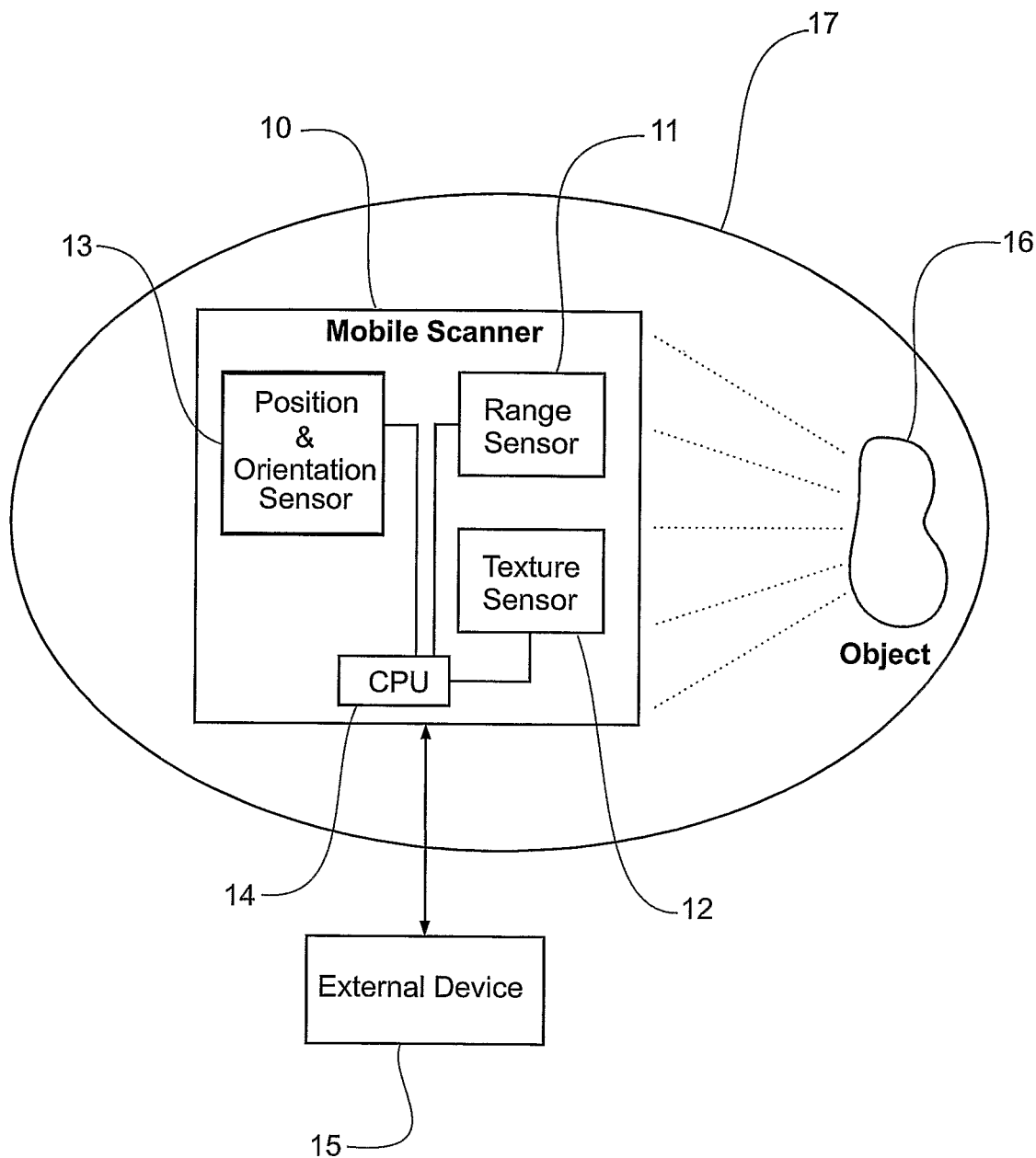
FIG. 1 shows a schematic diagram of the main modules of the preferred form 3D scene scanner.

Referring to FIG. 1, the hand-held mobile 3D scene scanner 10 comprises three sensors, namely a range sensor 11, a texture sensor 12, and a position and orientation sensor 13. Each of the sensors communicates with a control system 14 onboard the scanner 10. The control system 14 comprises a CPU, microprocessor, microcontroller, PLC or other device and is arranged to control and operate the sensors, along with receiving and processing information generated by the sensors. In particular, the control system 14 is arranged to receive information from each of the sensors 11,12,13 and process that information to generate a set of data elements representing the scan of the scene. In the preferred form, each data element may comprise information on the 3D position of that surface point in space, the texture values in the region of that surface point, and the position and orientation of the scanner 10 in space when the surface point was scanned. The control system 14 preferably comprises associated memory and input/output modules for storing and transferring this rich-3D data, which can be post-processed by software to allow visualisation and to produce 3D photo-realistic representations or 3D computer models of the scanned scene.

The preferred form control system 14 may communicate with other external devices 15, such as computers or output displays for example, via wire or wireless link to transfer data and information. It will be appreciated that communication could be via wire or wireless connection, optical fibre connection, or over any other communication medium. The control system 14 may also have an associated user interface that is operable by a user to control the scanner 10 and manipulate the data it obtains during and after a scan of a scene. For example, a user may operate the user interface to alter scanning parameters, such as sensitivity, resolution, gain, range filters, speed, integration time, accuracy and the like. The user interface may also be onboard the scanner 10 and may comprise a control panel having buttons, switches, dials, touch screens or the like. An output display may also be associated with the control system for displaying preliminary or full 3D photo-realistic representations of the scanned scene from the scan data during and after the scan.

It will be appreciated that various types of control systems may be utilised with the scanner 10. While the preferred form control system is entirely onboard the scanner 10, other control systems may be partially onboard or may be external to the scanner 10 and may control it remotely. For example, the scanner 10 may comprise an onboard CPU that coalesces data and information from the three sensors 11,12,13 and then transfers that information, via a wireless link for example, to an external base CPU that processes, collates and stores the scanned data.

Figure 2:
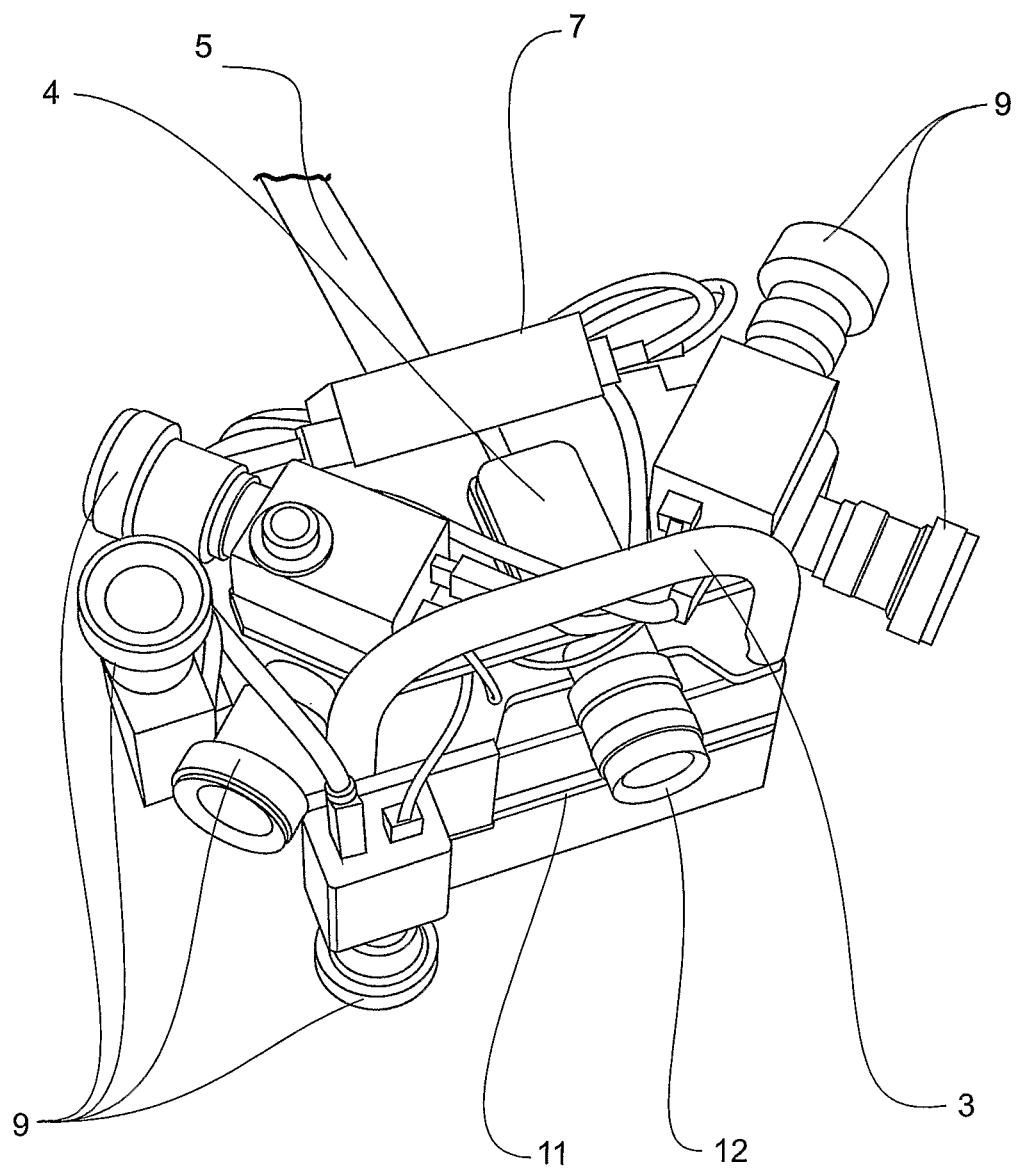
FIG. 2 shows a perspective view of a hand-held form of the 3D scene scanner.

In the preferred form, the scanner 10 has a housing that mounts each of the sensors 11,12,13, the control system 14, the user interface and the output display. The housing is arranged to be hand-held via a handle part or the like and is freely mobile about a scene to be scanned. It will be appreciated that the scanner 10 may be coupled to a robot arm or other moveable mechanism for automatically scanning a scene or for assisting the user to scan a scene if desired. By way of example, FIG. 2 shows a possible form of the mobile hand-held scanner 10 that includes a longitudinal handle 5 for the right hand of a user to and a transverse handle 3 for the left hand, or vice versa. A range sensor 11, texture sensor 12, user interface panel 7, inertial sensor 4, and direction sensor cameras 9 are visible in FIG. 2. The direction sensor cameras 9 are part of the optical tracking device of the position and orientation sensor 13. The inertial sensor 4 is also part of the position and orientation sensor 13 and is arranged to, for example, generate pose information if the optical tracking device experiences target dropout and/or enhance the robustness of the pose information generated by the optical tracking device. The position and orientation sensor 13 will be described in more detail later.

The range sensor 11 is arranged to obtain local shape information about surfaces and objects 16 within a scene on a point-by-point basis. In particular, the range sensor 11 is arranged to measure the distance and direction between the scanner 10 and each surface point in the scan of the scene and generate representative location information. The location information obtained is subsequently processed with the position and orientation information from the position and orientation sensor 13 to determine the 3D position of each surface point in space, typically defined by a local reference frame 17. The preferred form range sensor 11 is a light detection and ranging (LIDAR) device that generates a one-dimensional (1D) laser scan and computes time-of-flight measurements to sense the distance and direction between the scanner 10 and each surface point in the scan of the scene. The LIDAR device may have a range of, for example, 3 m with a 70 degree aperture and resolution of 1 mm. It will be appreciated that a range sensor that generates a two-dimensional (2D) laser scan could also be utilised if desired. Alternatively, the range sensor 11 may comprise a triangulation based device. For example, the range sensor 11 may comprise a camera arranged to view a laser light stripe generated by a laser device, the distance between the scanner 10 and each surface point being determined by triangulation calculations. In a further alternative form, the range sensor 11 may comprise a non-scanning sensor such as a time-of-flight camera range sensor. It will be appreciated that there are various types of range sensors that could be utilised in the scanner 10 and the range sensor 11 may be implemented using any 3D sensing principle. The type of range sensor utilised will depend on the desired specification defined by, for example, range, resolution, aperture size, viewing angle, accuracy and the like. Further, it will be appreciated that various properties of the range sensor 11, such as resolution, accuracy and sensitivity, may be controlled by the user during a scan.

The texture sensor 12 is arranged to obtain texture information about surfaces and objects 16 within a scene on a point-by-point basis. In particular, the texture sensor 12 is arranged to sense the texture in the region of each surface point in the scan of the scene and generate representative texture information. The texture information includes data about the colour of each surface point scanned and may be represented by hue, brightness and saturation data. In operation, the texture sensor 12 determines the texture of each surface point by sensing the light reflected from the surface point. In the preferred form, the texture sensor 12 is a colour camera arranged to capture images of the scene, the images being processed to extract texture information in the region of each surface point in the scan of the scene. The colour camera may be a video camera or a still-shot digital camera that is arranged to capture digital images of the scene, each digital image comprising an array of pixels and each pixel or group of pixels corresponding to a surface point in the scan of the scene. In operation, the digital images are processed and the texture information relating to the surface points in the scan of the scene is extracted from the pixels of the digital images. The texture sensor data for all viewpoints is then processed with the position and orientation information to extract the texture information in the region of each surface point. It will be appreciated that any form of imaging device having a colour image sensor, whether CCD, CMOS or otherwise, may be utilised as the texture sensor 12 to capture the texture information. In alternative forms, the texture sensor 12 may be a multi-spectral laser imager arranged to sense the texture information relating to the surface points in the scan of the scene.

It will be appreciated that there may not necessarily be a 1:1 relationship between the surface point sensed by the range sensor 11 and the surface point sensed by the texture sensor 12. For example, the range sensor 11 has a particular laser spot size and the range measurement is derived from a particular surface patch area. The texture sensor 12 may have a different spatial resolution, so there may be many texture measurements corresponding to a particular surface patch area. Further, the same surface patch area may be captured from different scanner 10 positions, thereby providing more texture values. The scanner 10 is arranged to process the captured data in a coherent manner to allow visualisation and to produce 3D photo-realistic representations or 3D computer models of the scanned scene or object.

The position and orientation sensor 13 is arranged to continuously monitor the pose of the scanner 10 in space during a scan of a scene. In particular, the position and orientation sensor 13 is arranged to sense the position and orientation of the scanner 10 in six degrees of freedom (6D) within a local reference frame and generate representative position and orientation information, which is utilised in three respects. First, the position and orientation information is processed with the location information from the range sensor 11 to determine the 3D position in the local reference frame of each surface point in the scene scanned. Second, the position and orientation information is processed with the texture information from the texture sensor 12 to extract the texture of each surface point. Third, the position and orientation information provides information on the viewpoint of the scanner 10 when scanning each surface point in the scan of the scene as it will be appreciated that each surface point may be scanned multiple times from different viewpoints and angles to generate the rich-3D data. The position and orientation sensor 13 may comprise optical, electromagnetic, GPS or inertial devices in combination or alone. A preferred form position and orientation sensor 13 will be described in detail later.

In operation, a user moves the hand-held scanner 10 progressively about the scene to scan all the desired objects and surfaces, much like a spray-paint gun would be used. As the scanner 10 is moved about the scene, the range sensor 11 and texture sensor 12 together rapidly record both the shape and colour of the scene, or more specifically the objects and surfaces within the scene. Because the scanner 10 knows its position and orientation in space, and hence its viewpoint at any instance in time, it may progressively build up data for creating a complete 3D scene representation by moving the scanner 10 around to survey the scene.

The result of a survey of a scene is a large computer file containing a digital 3D point cloud with associated image textures and viewpoint directions. This rich-3D data may be post-processed and stored so that it can be visualised for virtual fly-throughs, scene re-examination, measurement, copying, digital manipulation, and the like.

As mentioned, the scanner 10 preferably generates rich-3D data that comprises 3D point clouds in which each point has been tagged with the view direction from which it was captured by the scanner 10, along with the associated surface colour captured from multiple viewpoints. Most surveys will have a lot of redundancy of surface points captured from many different angles. The scanner 10 is capable of dealing with this redundancy by building a texture model based on the texture data obtained from different viewpoints. This texture model will allow subsequent rendering of the scene from any viewpoint. The model may be progressively constructed as data is gathered. The advantage of rich-3D data is that it may provide enhanced spatial accuracy and photo-realism in reconstructed scenes.

The scanner 10 is capable of scanning different sized scenes, whether large or small. It is also operable to scan isolated objects of varying size. The capabilities of the scanner 10 in this respect are dictated by the range, accuracy and sensitivity of the sensors and these specifications can be altered as desired. The preferred form scanner 10 is flexible in this respect and is operable to scan a broad range of different sized scenes and objects. For example, the preferred form scanner 10 is capable of scanning objects and environments of up to about 100 m in size (length or width), but ultimately there is no upper limit on the scene size except for what can practically be covered by the operator in reasonable time. The scanner 10 is operable to scan the surfaces of objects and environments at varying ranges, the lower and upper limits of the range being dictated by the capability of the sensors. The scanner 10 is designed to scan static objects and environments where nothing in the scene, except the scanner 10 itself, moves during the survey. As mentioned, the scenes could be terrain or objects of almost arbitrary complexity, and could be indoors or outdoors or both.

Figure 3:
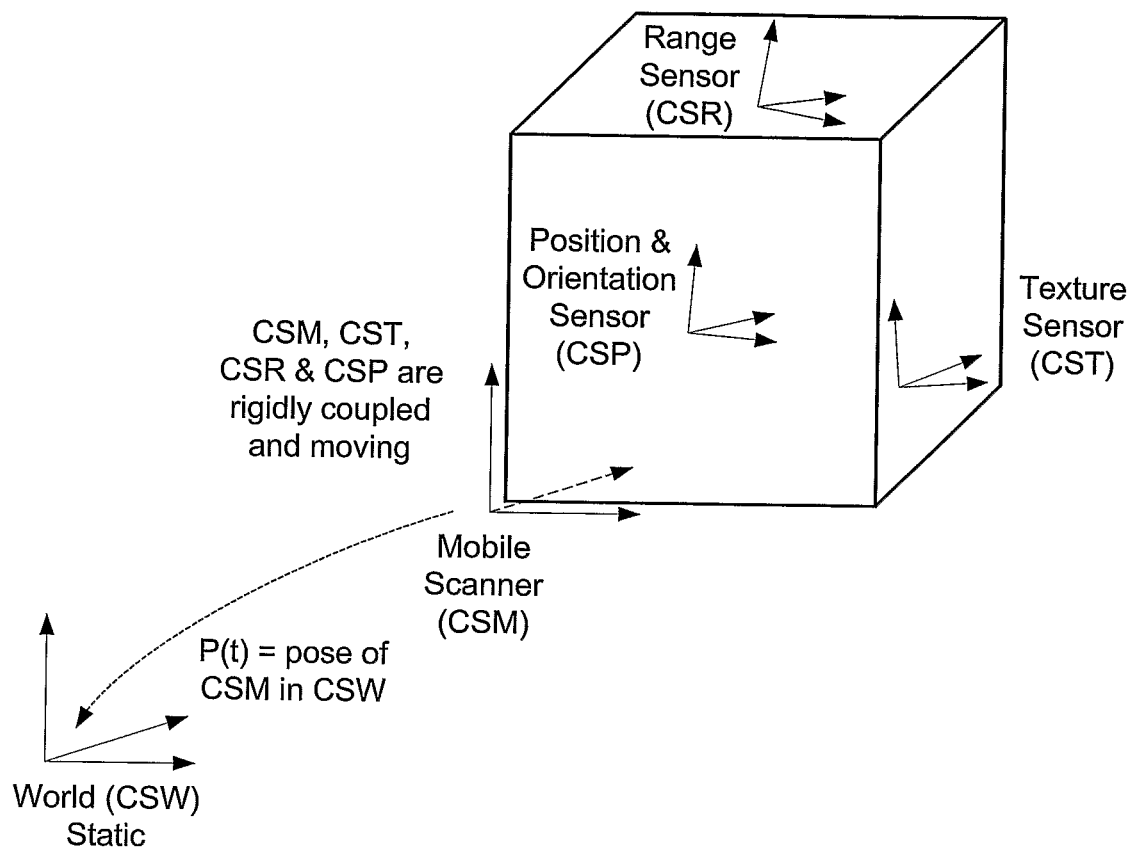
FIG. 3 shows a schematic diagram of the coordinate systems employed by the 3D scene scanner algorithms.
Figure 4:
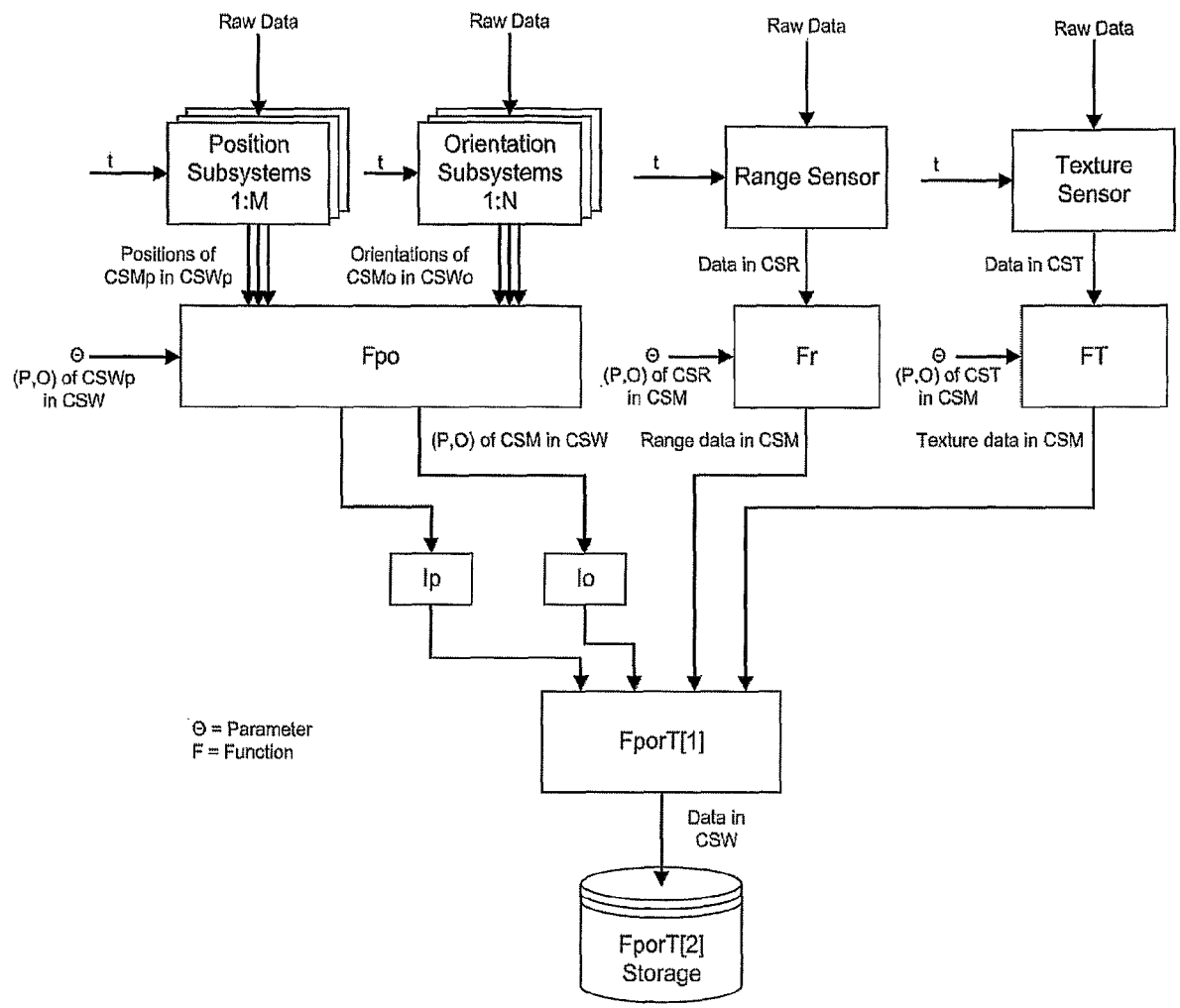
FIG. 4 shows a schematic diagram of the functional architecture employed by the 3D scene scanner.

Referring to FIG. 3, the coordinate systems employed by the scanner 10 in operation will be described. The preferred form scanner 10 utilises a series of coordinate transformations to generate the rich-3D data representing the scan of the scene. The range 11, texture 12, and position and orientation 13 sensors each have their own coordinate system, CSR, CST and CSP respectively. Through a series of calibrations, these can be related to the mobile scanner coordinate system CSM and hence spatial measurements from each sensor 11,12,13 can be transformed into the CSM. As the mobile scanner 10 is moved around within a scene, the spatial relationship between the scanner 10 and a fixed world coordinate system CSW is determined by the position and orientation sensor 13. In operation, data derived from the range 11 and texture 12 sensors at any point in time is transformed firstly into CSM and then into CSW. The outputs of the position and orientation sensor 13 are interpolated to obtain an estimate of the position and orientation of the mobile scanner 10 at that time. These concepts are elaborated in more detail below with reference to the functional architecture shown in FIG. 4.

In its most generic form, the scanner 10 can have a number of different position and orientation subsystems, which collectively make up the position and orientation sensor 13. As mentioned, the subsystems may be optical, electromagnetic, GPS, inertial or the like.

The or each position subsystem provides an estimate of the position of its mobile position sensor, mounted to or within the mobile scanner 10, with respect to its assigned reference coordinate system, defined as the position of CSMp in CSWp. For example, a GPS sensor would provide its position with respect to the earth's latitude and longitude coordinate system plus altitude. Similarly, the or each orientation subsystem provides an estimate of the orientation of its mobile orientation sensor, mounted to or within the mobile scanner 10, with respect to its assigned reference coordinate system, defined as the orientation of CSMo in CSWo. For example, a gyro-based orientation sensor provides its orientation with respect to the defined inertial frame of reference. A magnetic compass defines its orientation with respect to earth's magnetic field. It will be appreciated that some sensors may estimate both position and orientation. For example, an electromagnetic motion tracking system may be utilised. Such a system often utilises receivers, located on or within the mobile scanner 10, that provide their position and orientation information relative to a fixed-point reference source transmitting station.

As mentioned, the scanner 10 may employ multiple position and orientation subsystems of different types and the information derived from each can be processed to provide accurate position and orientation information pertaining to the mobile scanner 10 in a local reference frame or coordinate system. In essence the scanner 10 may employ a hybrid position and orientation sensor comprising complementary sensors, which are combined so as to overcome limitations of each. For example, an optical position and orientation subsystem (as described later) can be devised to provide highly accurate location sensing of a moving object, but loses its location when reference targets are obscured. Such a sensor could be combined with an inertial-based position and orientation sensing device to provide dead-reckoning position and orientation sensing during periods when the optical subsystem drops out.

The function or module Fpo transforms the position and orientation estimates from each position and orientation subsystem into a chosen common world coordinate system CSW.

For example, GPS coordinates may be transformed into a local coordinate system with an origin at a certain location within a scene, or a gyro-derived orientation estimate may be referenced to a chosen coordinate reference frame. Fpo requires input parameters θ relating each coordinate system to CSW. These parameters can either be defined explicitly, for example when one of the subsystem reference frames is defined as the world reference frame, or may be derived through a calibration process. The output of Fpo is the pose (position and orientation) of CSM in CSW.

The range sensor 11 produces data referenced to its own local coordinate system CSR. Function Fr translates this into CSM using parameters derived from calibrating the fixed range sensor 11 with respect to its position on or within the mobile scanner 10 housing. Similarly, the texture sensor 12 data is translated into CSM using Function FT.

Fr may also be arranged as a data filter. In particular Fr may be arranged to filter range data to remove points that, by reason of their relationship to other nearby points sensed by the range sensor, are deemed to be unwanted. By way of example, typical scenes might not include individual or small collections of points that are isolated in space from other points and may thus be discarded at an early stage. It will be appreciated that Fr may be configured to automatically discard or dump data that it deems is unwanted in the context of the scan of the scene. The real-time data filtering capability of Fr increases data processing speeds as it enables the scanner 10 to discard or dump unwanted data early in the processing scheme.

The data from the position and orientation subsystems, range and texture sensors may not necessarily be coincident in time. Therefore, functions Ip and Io interpolate the data streams enabling the position and orientation to be determined at arbitrary moments in time. Function FporT[1] transforms the range and texture data into CSW using the pose data from Fpo. FporT[1] may be manually configured to ignore data relating to certain areas or regions of the scene as selected by the user. For example, the user may be able to manually select zones, boundaries or regions of a scene that are to be scanned. There may be multiple regions and the boundaries can be set in any one or more dimensions in the X, Y or Z planes. By way of example, the user may set a lower Z-plane limit, for example 5 inches above the ground, and any data scanned that is below that limit is discarded instantly. Further, the user may designate a boundary in the scene in the X-Y plane around an object to be scanned in the scene, and any data scanned from outside that boundary is discarded instantly. It will be appreciated that any number of different forms of scanning boundaries, regions or zones may be set by the user. Further, there may be multiple scanning zones or boundaries designated within the same scene. It will be appreciated that the scanning boundaries, regions and/or zones may be designated in a number of ways by the user. For example, the user may set the scanning regions and the like via a user interface that displays a real-time representation of the scene, for example captured by a camera. Alternatively, the scanner 10 may be set into a scanning zone selection mode and may carried around the scene and operated by the user to mark-out the scanning zones to tag the zones and boundaries. It will be appreciated that the scanning zone selection may be achieved in other ways also, i.e. any data that relates to surface points or patches outside the selected zones or regions in the local reference frame of the scene is instantly disregarded and dumped.

Function FporT[2] translates the data into a recognized standard format. It will be appreciated that the foregoing functional architecture is one example of how the information from the range 11, texture 12, and position and orientation 13 sensors may be processed to produce the rich-3D data representing the scan of the scene. Other algorithms and data processing methods may be implemented to achieve the same result. While the data processing method described is asynchronous, it will be appreciated that data processing may alternatively be implemented in a synchronous manner if desired.

The stored scanner 10 output data is a large data set, preferably in the form of rich-3D data. For example, every surface data point could contain its 3D position coordinates in CSW, the corresponding texture sensor values plus the 3D coordinates in CSW of the scanning location where this surface point was sensed from. With the scanner 10, the same surface point may be sensed multiple times from different viewpoints. This is a desirable feature since multiple instances of the same surface point can be used to resolve shape or texture ambiguities caused, for example, by noisy data or specular reflections. The scanner 10 generates a complete surface description of all surfaces and objects in a scene in rich-3D data format.

Figure 5:
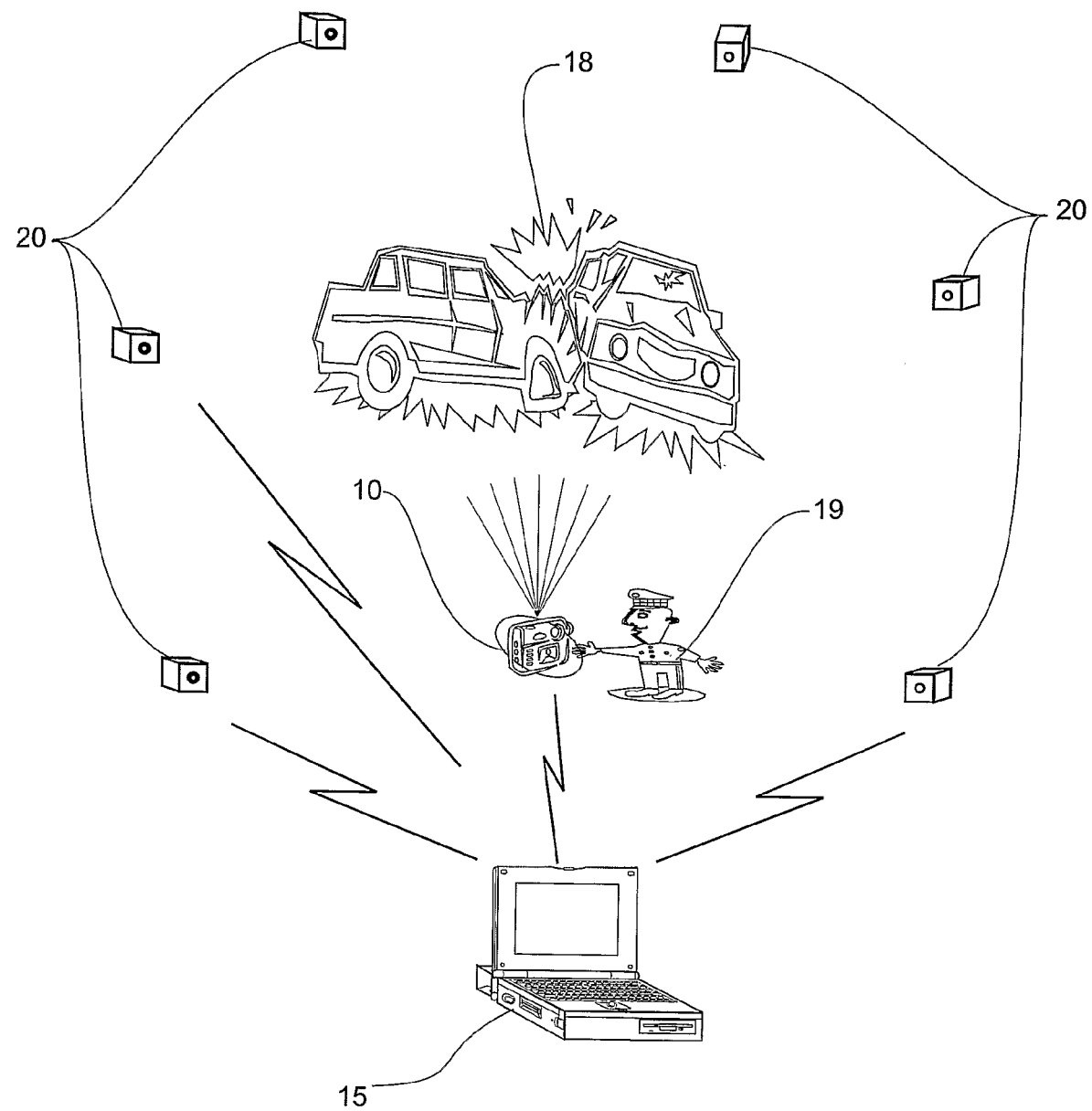
FIG. 5 shows a schematic diagram of the 3D scene scanner in use at the scene of a car crash.

Referring to FIG. 5, the typical operation of a preferred form 3D scene scanner 10 will be described. The preferred form scanner 10 to be described utilises a hybrid optical position and orientation sensor 13 comprising an optical tracking device that tracks reference targets located in the scene and an inertial sensor. An example embodiment of the optical tracking device and reference targets will be described in more detail later.

The scene depicted in FIG. 5 is a car crash 18 and the scanner 10 may be utilised to scan the scene, including the exterior and interior of the vehicles involved in the crash, surrounding objects, skid marks on the road and any other objects or surfaces desired. The data generated by surveying the scene with the scanner 10 may then later be utilised to create evidential 3D photo-realistic representations and 3D computer models of the crash scene for later analysis by, for example, investigators trying to determine the cause of the crash or the party at fault.

The preferred form portable 3D scanning system, comprising the hand-held mobile scanner 10, reference targets 20, and laptop 15, may be transported easily to the crash scene by the operator 19 in a carry-case or the like. To scan the scene, the operator 19 starts by placing a number of reference targets 20 in suitable locations around the scene. The reference targets 20 provide a framework for the optical tracking device of the position and orientation sensor 13 onboard the scanner 10 and in the preferred form system the location of the reference targets 20 define a local reference frame within which the scanner 10 can operate. The location of the reference targets 20 can be determined arbitrarily and randomly by the operator 19. The scanner 10 does not need to be pre-programmed with the reference target 20 locations as the target locations are obtained automatically by the scanner 10 in operation. The reference targets 20 can be tripod mounted or otherwise mounted in convenient locations, for example they may be placed on objects in the scene. The number of reference targets 20 is flexible and is dictated by the size and complexity of the scene. The key requirement is optimum visibility from the scanner 10 in operation. Not all the reference targets 20 need to be visible at all times, but to maintain position and orientation sensing integrity at least three must be visible at any one point in time.

As previously mentioned, the position and orientation sensor 13 may comprise a number of position and orientation subsystems to enhance accuracy and reliability. Therefore, the optical tracking device may be augmented with other inertial sensors, such as gyros, accelerometers, inclinometers or the like, to maintain spatial position and orientation sensing capability in the event of target visibility dropout. It will be appreciated that electromagnetic, GPS, or other types of position and orientation sensors or systems may be utilised to supplement the optical tracking device also. In the preferred form, an inertial sensor is provided to supplement the optical tracking device if there is target dropout and/or to enhance the robustness of the pose information provided by the optical tracking system. It will be appreciated that the position and orientation sensor may employ the optical tracking system alone or any other pose tracking system alone, but it will be appreciated that a hybrid sensor comprising a combination of tracking devices may be desirable in circumstances where the nature of the scene to be scanned reduces the effectiveness of a particular type of tracking device.

Once the reference targets 20 have been placed about the scene, the operator 19 can begin scanning the scene by moving the scanner 10 over and around the objects and surfaces to be scanned. The position and orientation sensor 13 of the scanner 10 automatically determines the relative locations of the reference targets 20 and its position and orientation with respect to them. After a while, for example when sufficient calibration information has been estimated, the scanner 10 will start displaying a rough visualisation of the scanned scene on an output display either on the scanner 10 or an external device communicating with the scanner 10.

There are few restrictions on scanner 10 motion and the same area can be scanned several times from different directions if desired. If the operator wants a rough picture right away, they can move through the working volume before capturing any detailed data. Scanning will be an interactive experience with visual feedback preferably being provided by means of a screen on the scanner 10 to aid the operator 19 in assessing areas already scanned. The operator 19 is able to add/remove/move reference targets 20 at any time and the scanner 10 will automatically adjust by registering the new locations of reference targets 20. In the preferred form, the scanner 10 will also diagnose geometrically ill-conditioned reference target 20 configurations and advise the operator 19 to, for example, add or move a target. In particular, it will be appreciated that the accuracy of the optical tracking device is dependent on the number of reference targets that are visible and the geometric relationship of those visible targets relative to each other in the scene. If the targets are spaced closely together in one region of the scene, the pose information generated by the optical tracking device is likely to be less accurate than if the targets were distributed more evenly about the scene. In the preferred form, the scanner 10 may be arranged to provide the user with feedback on whether optical tracking device can provide accurate pose information for a particular distribution and spread of targets within a scene. The user may then add more targets or rearrange the targets in accordance with that feedback on the quality of the distribution or spread.

As shown, the scanner 10 communicates wirelessly with an external device 15, such as a portable laptop, PDA or other mobile computer. In particular, the control system 14 onboard the scanner 10 is arranged to transfer scanned data to the external computer 15 for post-processing and storage. In one form, the external computer 15 may perform some control system functions for the scanner 10, such as communicating with reference targets 20 or controlling scanner 10 settings remotely via a wireless link. As mentioned, the control system for the scanner 10 can be partially external to the scanner itself in some embodiments. Furthermore, it will be appreciated that communication between the scanner 10, external devices 15, and reference targets 20 may be via wire if desired.

In the preferred form, the scanner 10 has an onboard user interface that is operable by an operator 19 to alter various scanner 10 settings, such as the sensitivity, accuracy, resolution, and range of the scanner 10 and its sensors 11,12,13. For example, objects of interest can be scanned at high resolution, whereas background objects, such as roads at a car crash scene, can be scanned at lower resolutions. As previously mentioned, the scanner 10 may be arranged to allow the user to select scanning zones and regions within the scene and this may be achieved, for example, via the user interface and an output display showing a representation of the scene containing the zones. During the scanning, the user may, via the user interface, change the scanning resolution, for example, to scan some areas in high resolution and other background areas in low resolution. Once the user has configured these settings, the scanner 10 will automatically adjust during the scan of the scene, for example to dump data relating to surface points or patches outside the selected scanning zones.

Once the raw scan data has been acquired, post-processing data conversion and visualisation software can be utilised to allow the data to be useful in any application. It will be appreciated that the scanner 10 itself or any external device 15 processing the 3D data scanned may utilise such software and that the software can be customised to suit particular applications. For example, conversion software may process the rich-3D point-cloud data to produce alternative data constructs that can be imported into visualisation or CAD software programs.

An example of an optical tracking device utilised in the position and orientation sensor 13 of the scanner 10 will now be explained. The optical tracking device is mounted to or within the scanner 10 housing and is arranged to sense the position and orientation of the scanner 10 by tracking visible reference targets 20 located in the scene. In one form, the optical tracking device comprises one or more direction sensors arranged to detect visible reference targets 20 and generate direction information relating to the direction of the visible reference targets relative to the scanner 10. Further, the optical tracking device has a control system that processes the direction information to determine the position and orientation of the scanner 10 in space or with respect to a local reference frame or coordinate system defined by the location of the reference targets 20.

The optical tracking device comprises one or more direction sensors or a substantially omnidirectional direction sensor arranged to provide estimates of the direction to visible reference targets 20 in the scene. The omnidirectional direction sensor may comprise an arrangement of optical sensors arranged to view outwardly relative to the scanner 10 to provide direction information relating to any visible reference targets 20. The optical sensors may be video or still-shot digital cameras that utilise electronic image sensors, whether CCD, CMOS or otherwise. It will be appreciated that other types of direction sensors could be utilised, such as lateral effect photodiodes or the like.

Figure 6:
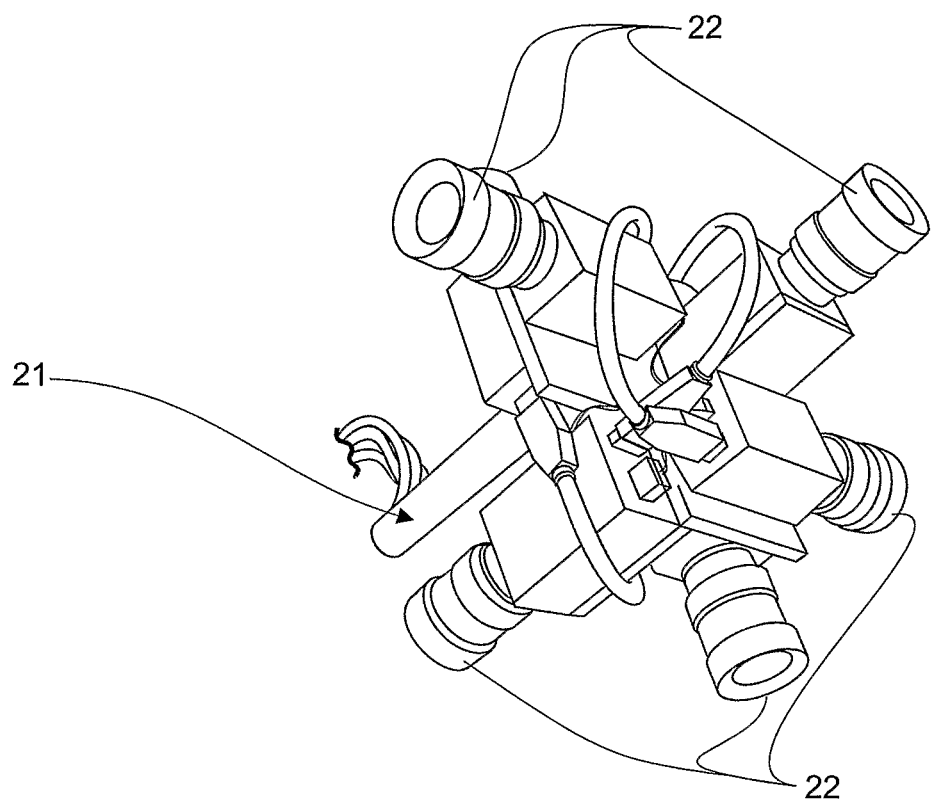
FIG. 6 shows a perspective view of one form of optical tracking device of the position and orientation system.
Figure 7:
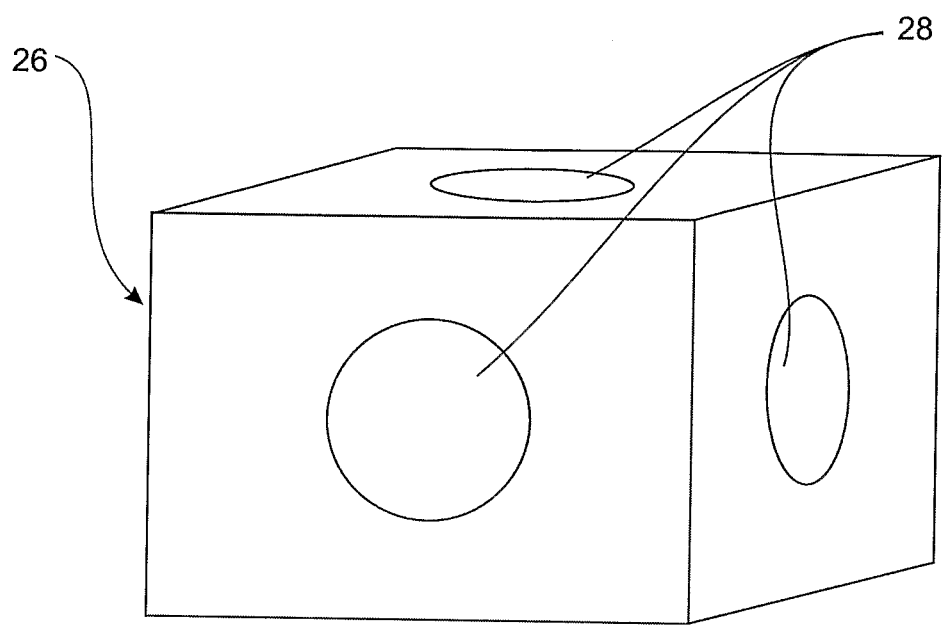
FIG. 7 shows a perspective view of another form of optical tracking device of the position and orientation system.

By way of example, FIG. 6 shows one possible form of an omnidirectional direction sensor 21 that may be utilised by the optical tracking device. The sensor 21 is implemented optically using a set of video cameras 22, mounted on a mobile frame, that are arranged to view stationary reference targets 20 located in the scene to be scanned. For example, six cameras 22, outward pointing and rigidly mounted to or within the scanner 10 as if on each side of a cube, are used as direction sensors. It will be appreciated that more or less cameras may be utilised in other arrangements. Each camera 22 provides estimates of the direction to each reference target 20 visible to that camera. Rather than manually surveying the reference target 20 locations in the scene, the optical tracking system utilises an auto-calibration algorithm to automatically determine and maintain target locations. Once the reference target 20 positions are known, it is possible to uniquely identify the position and orientation (pose) of the group of cameras 22 and hence the scanner 10 within the local reference frame defined by the targets 20. It will be appreciated that the camera rig shown in FIG. 6 may be reduced in size and implemented in alternative ways to reduce the overall size and mobility of the hand-held scanner 10. For example, FIG. 7 shows another possible form of omnidirectional direction sensor 26 that may be utilised by the optical tracking system. The sensor 26 is a cube-like structure with lens holes 28 in each wall. The structure houses six optical sensors that are each arranged to view outwardly through a respective lens hole 28 to detect visible reference targets as described previously. As mentioned, the optical sensors could be electronic image sensors or lateral effect photodiodes or any other technology that is capable of acting as a direction sensor to external targets.

Reverting to FIG. 6, each camera 22 is individually calibrated to determine its intrinsic calibration parameters, for example those parameters that characterise the optical, geometric and digital characteristics of the camera/lens combination, including focal length, optical centre of sensor, and pixel height & width. These parameters allow each pixel in the camera 22 to be translated into a ray in space with respect to the camera's coordinate system.

Figure 8:
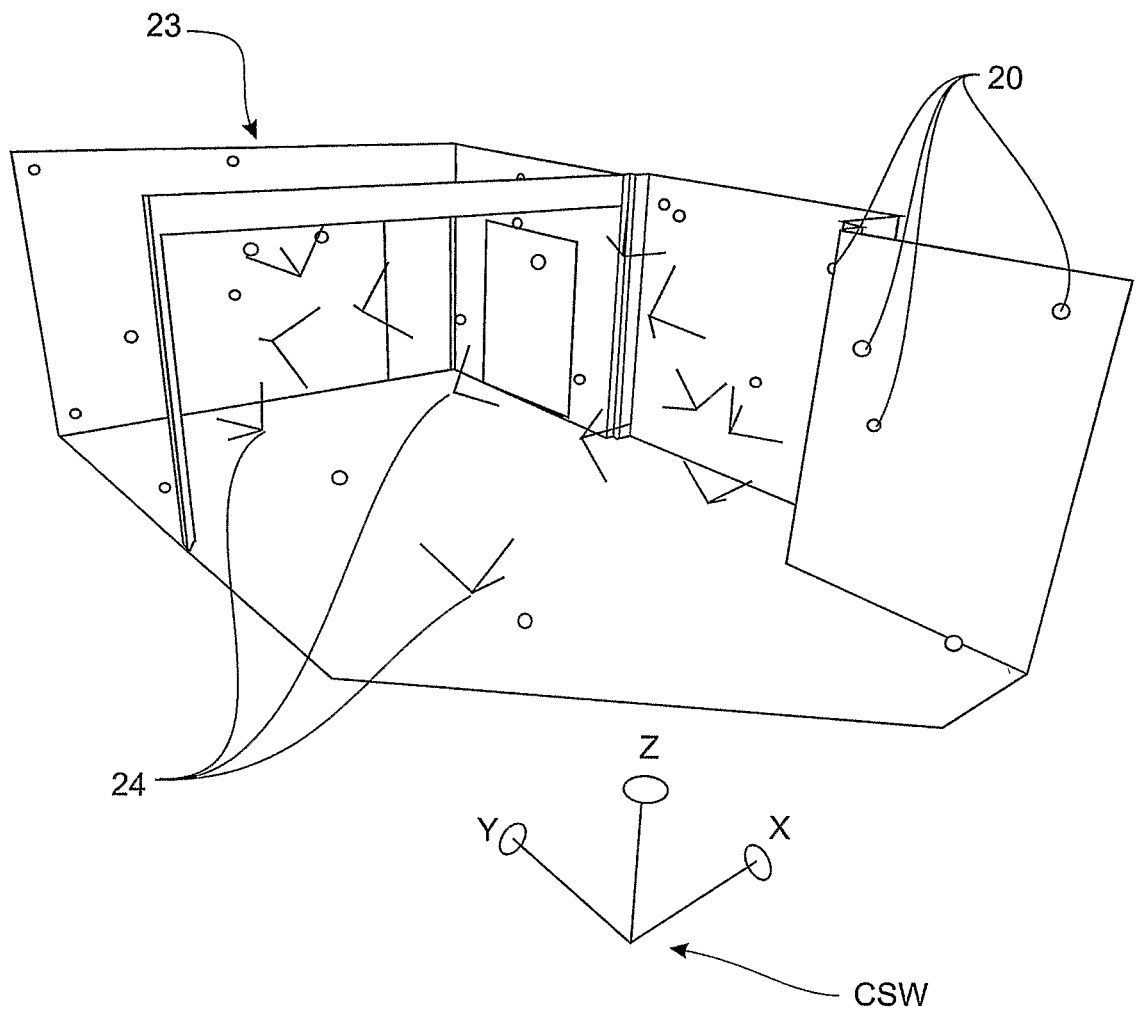
FIG. 8 shows a schematic diagram of the position and orientation system detecting visible reference targets in a scene in order to sense position and orientation.

The auto-calibration algorithm to determine reference target locations and the pose tracking algorithm to determine the pose of the scanner 10 will now be described in more detail with reference to FIG. 8.

To describe the algorithms, we assume that the optical tracking device utilises a set of M calibrated cameras that have a fixed spatial relationship relative to each other, for example they are rigidly coupled together. The set of cameras is referred to as the camera group. The cameras are organised to approximate an omnidirectional camera with their optical centres as coincident as physically possible, and the image planes providing maximum coverage with as little overlap as possible. The geometric relationship between each camera is known by means of a group calibration process, so the camera group can be characterised by a single moving coordinate system denoted CSM. For example, CSM may be identified with the camera coordinate system of one of the cameras. The cameras are synchronised so that a single frame capture event will grab M images. A world coordinate system, denoted CSW, is defined in terms of K stationary reference targets 20 located in a scene 23 (e.g. one target is at the origin, another on the x-axis and another in the xy-plane).

In both the auto-calibration and pose tracking methods, a set of M images of the reference targets 20 is captured (one from each camera) at each camera group CSM position. Not all the reference targets 20 will necessarily be visible as the sensors do not give complete coverage and the targets may also be occluded. Some reference targets 20 may also be visible in more than one image because of small amounts of sensor overlap. A target pixel location is extracted using a sub-pixel estimator then back-projected through the camera model to get a ray in the camera coordinate system. The ray is then rotated and translated to provide a line in CSM.

In the auto-calibration method, the camera group CSM is moved to N positions 24 in CSW and for each position a sequence of images of targets is acquired with targets selectively activated according to a pattern. Analysis of the sequence of images (frame events) yields a set of lines in CSM, corresponding to the set of visible targets, labelled with their target identifiers.

By way of example only, the camera group may have six outward looking cameras (M=6) as previously described and there may be 32 reference targets in the scene. At each of the N positions in the scene the camera group may be arranged to rapidly capture 33 frame events (sets of 6 images) as the reference targets are selectively activated to sequence through a pattern. The pattern may, for example, involve selectively activating one target at a time for the first 32 frame events and then activating all 32 targets for the $33^{rd}$ frame event. As previously mentioned, analysis of the 33 frame events yields a set of lines in the CSM, corresponding to the set of visible targets, labelled with their target identifiers.

It will be appreciated that various pattern sequences may alternatively be utilised. For example, binary coded sequences or other coded sequences could be implemented to selectively activate the targets as the camera group captures frame events at each of the N positions. Further, the number of frame events required at each of the positions is inherently related to the type of sequenced pattern generated by the reference targets. More efficient pattern sequences will require fewer frame events at each of the N positions to yield the required set of labelled lines. It will also be appreciated that the number of reference targets may be varied according to the nature of the scene. Ultimately, the auto-calibration method may work on considerably fewer targets. Further the number and location of the N positions may vary and can be selected at random.

Once the above process has been carried out, the problem can be stated as: given a set of labelled lines in CSM captured from N positions, recover the position of the K targets in CSW. The solution involves three steps:

(1) Calculate initial estimates of the camera group pose for n=1, . . . N, using a closed form algorithm;
(2) Calculate accurate estimates of the camera group pose by non-linear minimization; and
(3) Reconstruct the target positions in CSW by triangulation using the set of labelled lines and accurate camera group pose estimates.

Referring to step (1), this is carried out to avoid ambiguities in the non-linear minimization that occurs in step (2). In particular, the initial estimates of the camera group pose at each of the N positions assist in avoiding local minima of the objective function used in performing the non-linear minimization to calculate accurate estimates of the camera group pose. There are various closed form algorithms that may be utilised to calculate the initial estimates and each algorithm makes certain assumptions. By way of example, one closed form algorithm calculates the initial estimates based on approximating the camera group by a more idealised omnidirectional camera in which all the optical centres are coincident and positioned at the origin of the CSM. This allows many standard results to be applied directly and the results may be expressed in terms of geometric algebra. The algorithm may then employ the well known essential transformation to determine the relative pose between each of the N positions. The relative pose may be expressed in terms of direction and orientation, but not distance as a unit translation is assumed. The essential transformation considers the labelled lines at each of the N positions of the CSM and obtains estimates of the relative pose (with unit translation) between the positions of the CSM. These estimates can then be transformed into CSW to give initial estimates of the relative direction and orientation between the positions of the CSM and known distances (yardsticks) can be used to rescale the estimates. For example, yardsticks might be obtained via measuring the actual distance between two reference targets.

Referring to step (2) accurate estimates of the camera group CSM pose at each of the N positions are calculated using a non-linear minimisation algorithm and the initial estimates calculated in step (1). By way of example, an objective (error) function and its gradient is utilised so that the problem can be formulated as a standard non-linear optimisation. The non-linear optimisation does not assume the idealised omnidirectional camera approximation. The lines associated with a given target K will nearly intersect.

Image noise and quantisation, calibration errors, camera modelling errors etc will prevent them from intersection exactly. The objective (error) function is utilised to minimise the dispersion of the lines about their nominal intersection point. The objective function, constraints such as yardsticks, the gradients of the objective function, and the initial estimates enable the problem to be formulated as a standard optimisation with barrier functions, or a constrained optimisation. The results of the optimisation provide accurate estimates of the camera group CSM pose at each of the N positions in CSW.

Referring to step (3), the positions of the K targets in CSW may then be triangulated using the set of labelled lines and accurate camera group pose estimates at each of the N positions. This involves mapping the labelled lines into CSW and then triangulating the lines associated with each of the K targets. During steps (1)-(3), a temporary assumption is made that the origin of CSW is identified by one of the N positions of the camera group CSM. This can now be dropped and the true CSW can be constructed out of the targets and the target positions mapped into this CSW.

As mentioned, once the auto-calibration method has obtained the target locations, the scanner can be arranged to diagnose geometrically ill-conditioned reference target configurations and provide feedback to the user on whether the optical tracking device can provide accurate pose information for a particular distribution and spread of targets within a scene. The target location feedback may advise the user to, for example, add a target or rearrange the targets for a better spread across the scene. For example, the target location feedback algorithm may involve calculating some measure of dispersion of the unit direction vectors from the direction sensors to each target, where a high dispersion represents a good target configuration and a low dispersion indicates a poor target organization.

In the pose tracking method, the camera group CSM is moved continuously in CSW and a continuous sequence of target image sets is acquired, each containing M images. For each image set (frame event), the set of observed lines in CSM, corresponding to the set of visible targets, can be determined. The problem can now be stated as: given the set of lines in CSM for each frame capture event, estimate the pose of the camera group. The camera group pose estimation is accomplished by repeating the following steps:

(1) Predict the current pose based on the previous pose estimates using extrapolation;
(2) Associate target labels with each line in CSM; and
(3) Update the current pose prediction using the targets and lines using a non-linear algorithm.

Before steps (1)-(3) are traversed, the pose tracking method implements an initial boot-strapping process to provide an initial pose estimate. The initial pose estimate is obtained by maintaining the camera group CSM at an initial position and then acquiring a sequence of images of the targets as they are selectively activated according to a pattern. By way of example, this process may be similar to that carried out by the auto-calibration process at each of the N positions. Analysis of the sequence of images (frame events) yields a set of lines in CSM, corresponding to the set of visible targets, labelled with their target identifiers. As the target positions are now known, an initial pose estimate of the camera group can be determined using triangulation.

After the boot-strapping process, steps (1)-(3) are repeated rapidly for each frame event to provide continuous estimates of the camera group in CSW. As mentioned, during steps (1)-(3) all reference targets are activated during each frame event and hence the observed lines to each of the targets in CSM are not labelled.

Referring to step (1), extrapolation is used to predict the current pose based on previous pose estimates. Referring to step (2), the predicted pose and previous set of labelled lines are used to get a prediction of the next position of the labelled lines. The observed set of lines, whose identifiers are unknown, are associated with target labels or identifiers based on the predicted labelled lines determined. This is essentially done by matching the predicted labelled lines with the closest observed unknown lines. Referring to step (3), the labelled set of observed lines is now utilised to provide a camera group pose estimate and update the current pose prediction using a non-linear algorithm for the next iteration of steps (1)-(3).

Reverting back to the boot-strapping process, this provides an initial prediction of the current pose for step (1) of the first iteration of steps (1)-(3). The boot-strapping process is not utilised after the first iteration.

It will be appreciated that all reference targets do not necessarily have to be activated for each frame. The pose tracking method could utilise a patterned sequence of activation in alternative forms of the tracking method.

As the optical tracking device is onboard the scanner 10, the camera group pose reflects the position and orientation of the scanner 10.

The preferred form reference targets 20 comprise a powered light source that emits visible electromagnetic radiation for detection by the cameras 22 of the optical tracking device. For example, the light sources may be LEDs, or more particularly high-power blue LEDs. The LEDs may be operated to glow continuously or may be pulsed at a particular switching frequency. In the preferred form, the LEDs of the reference targets 20 are pulsed in synchronism with the direction sensor camera shutter. This allows a much higher LED intensity than that possible with continuous operation and improves LED contrast with ambient since each camera is only acquiring light when the LEDs are operating. Further, the direction sensor cameras may utilise optical filtering to further enhance the contrast with ambient. The preferred form LEDs are individually addressed to provide facility for unique identification by direction sensors.

It will be appreciated that other types of reference targets may be utilised if desired. Essentially, the only limitation is that the reference target must have a characteristic that is distinguishable and detectable by the optical tracking device. For example, the reference targets may comprise any mobile powered or non-powered object, device, beacon, marker, pattern, landmark or combination thereof.

It will be appreciated that the optical position and orientation system, comprising the optical tracking device and reference targets, may be utilised in other applications to sense the position and orientation of any mobile object. The position and orientation system is not limited to scene scanning applications and may be utilised as a 6D optical tracking system in its own right in other applications. The optical position and orientation system works on an inside-out basis where the optical tracking device is mounted to or within the object to be monitored and this arrangement is particularly suited to certain applications. The position and orientation system could be integrated with other systems and may comprise its own user interface and output display for displaying position and orientation information. The control system onboard the optical tracking device may also be arranged to communicate with external devices, via input/output modules, to transfer data. The preferred form optical position and orientation system is capable of working within a vast range of different sized areas, whether indoor or outdoor. For example, the optical tracking device may detect targets up to 50 m away, but it will be appreciated that the range and accuracy of the optical tracking device can be extended by utilising different components if desired. In addition, the optical position and orientation system may be supplemented with additional electromagnetic, GPS, or inertial sensors to enhance robustness or to aid in target drop out situations. Such hybrid configurations of the position and orientation system will be advantageous in certain environments.

Summary of the 3D Scene Scanner Functionality

The 3D scene scanner is a photo-realistic wide-area flexible 3D scanning device, which provides free-form scanning of large and complex-shaped objects or scenes over wide areas, which provides both 3D metric and surface texture data and which works on a wide range of materials including ferrous materials. The scanner embodies a sophisticated and complex integration of sensors, electronic systems and computer vision/geometric algorithms which together enable the acquisition of 3D photo-realistic representations and 3D computer models of scenes and objects. The flexible hand-held scanner can capture accurate photo-realistic 3D data over wide areas, different sized scenes, and different sized objects. The scanner comprises the integration of position and orientation sensing, range sensing and texture sensing technologies to enable the acquisition of complete photo-realistic 3D scene and object models.

The 3D scene scanner is hand-held and this enables a vast variety of complex objects or scenes to be scanned. Objects of any shape can be scanned, in the amount of detail needed, inside and outside, at any angle and from any direction. The only proviso is that the position and orientation sensor must maintain positional integrity during the scanning process. For the optical tracking device, this means at least three reference targets must be viewable by at least one of the direction sensor cameras. However, in the preferred form 3D scene scanner the position and orientation sensor will be a hybrid of the optical tracking device and an inertial sensor or other supplementary sensors or tracking devices that maintain pose estimates if the optical tracking device drops out.

The 3D scene scanner has a user interface that is operable by a user to activate different functions and alter settings as desired. For example, it is possible to register regions of interest enabling a user to scan two or more regions in the same scene in detail and little in-between, yet maintain the exact spatial relationships between the scanned regions. The scanner also provides the user with detail control. For example, a user can vary the scanning density to obtain highly accurate detail where it is needed and coarse sampling where detail is less important, all within the same scene. The scanner produces rich-3D data, which is a data structure that contains all the multiple directions from which each 3D point has been surveyed, as well as the captured image data at that point from multiple directions. The rich-3D data captured by the scanner opens up many post-processing possibilities for super-realistic scene visualization. The scanner is very flexible in that it is easy to transport, to set up and to use immediately in almost any environment, with all on-site calibration happening automatically. Also the inside-out optical position and orientation sensor utilised in the preferred form scanner enables unconstrained reference target location and automatic self-calibration of the position of these.

While the preferred form 3D scene scanner has been described as a hand-held mobile scanning device, it will be appreciated that the scanner may be arranged to be mounted to a vehicle, aircraft or any other mobile platform for scanning of larger scenes, for example cityscapes or landscapes. The 3D scene scanner is a local range and image scanner that always knows its position and orientation in space. By combining range and image data with knowledge of the position from which these are obtained, the scanner is able to generate data that can be processed to reconstruct a spatially accurate and photo-realistic representation of a scanned environment. As mentioned, the scanner may be provided in a hand-held form or it is portable in that is can be mounted to a mobile platform, such as a vehicle, aircraft, robot scanning mechanism or the like.

It will be appreciated that the concepts underlying the scanner are extendible and may be implemented with various technologies. For example, the position and orientation sensing technology could be changed or upgraded without compromising the overall design integrity or the 1D laser range sensor could be swapped for another using a different 3D sensing principle.

Applications

The 3D scene scanner and rich-3D data it generates may be utilised in a myriad of applications. For example, photorealistic 3D visualisation is becoming an important requirement of applications as diverse as surgical training and digital special effects. The rich-3D data generated by the scanner contains enormous amounts of visual and spatial information about scenes and objects. This presents a significant opportunity to develop new ways of acquiring, representing and rendering such rich-3D data. By way of example, potential applications of the scanner include:

Rapid scanning of accident sites and crime scenes for evidential recording and subsequent analysis;

Scanning 3D models, actors and sets for movies and computer games;

As-built surveying and design verification of large structures, such as aircraft, boat hulls or buildings;

Scanning of large 3D objects or assemblies, for example aircraft landing gear, for use in computer-based models used in applications such as online training or maintenance manuals;

3D scanning for archiving and subsequent virtual display of works of art such as statues and sculptures;

Terrain capture of archaeological sites; and

Scanning people for accurate modelling, fitting and visualisation of custom designed clothing.

The foregoing description of the invention includes preferred forms thereof. Modifications may be made thereto without departing from the scope of the invention as defined by the accompanying claims.

The invention claimed is:

1. A position and orientation system for sensing the position and orientation of a mobile object that is moveable in an environment comprising:

a control system;

multiple reference targets located in random positions within the environment to define a local reference frame, the positions of the reference targets being unknown to the control system at start-up of the control system;

an optical tracking device mounted to the mobile object comprising one or more direction sensors that are arranged to detect visible reference targets and generate direction information relating to the direction of the visible reference targets relative to the optical tracking device, the direction information being continuously updated as the mobile object moves within the environment; and wherein the control system is arranged to operate the optical tracking device, receive the direction information, and process the direction information to: initially auto-calibrate at start-up to determine the 3D positions of the reference targets relative to each other within the local reference frame; and then subsequently generate updated position and orientation information relating to the current position and orientation of the mobile object in the local reference frame during movement of the mobile object based on the continuously updated direction information and the determined 3D positions of the reference targets at start-up.

2. A position and orientation system according to claim 1 wherein the direction sensors of the optical tracking device are optical sensors that are each arranged to view outwardly relative to the scanner to provide direction information relating to any visible reference targets.

3. A position and orientation system according to claim 2 wherein the optical sensors comprise an arrangement of cameras that view outwardly relative to the mobile object to provide direction information relating to any visible reference targets.

4. A position and orientation system according to claim 1 wherein the one or more direction sensors of the optical tracking device are arranged to form an omnidirectional direction sensor.

5. A position and orientation system according to claim 1 wherein the reference targets each comprise a switchable light source that is arranged to emit light for sensing by the direction sensors of the optical tracking device.

6. A position and orientation system according to claim 1 wherein the control system is arranged to periodically auto-calibrate during operation to register the movement, removal, and addition of reference targets to the environment.

7. A position and orientation system according to claim 1 wherein the control system is arranged to provide the user with feedback on the quality of the distribution of the reference targets within the environment after auto-calibration has taken place, the distribution of the reference targets affecting the accuracy of the position and orientation information generated.

8. A position and orientation system according to claim 1 wherein the control system comprises a user interface that is operable by a user to control the system and an associated output display for presenting the position and orientation information.

9. A position and orientation system according to claim 1 further comprising an inertial sensor that is arranged to sense the position and orientation of the mobile object and provide representative position and orientation information if the optical tracking device experiences target dropout.

10. A method of sensing the position and orientation of a mobile object that is moveable in an environment comprising the steps of:

placing multiple reference targets at random positions within the environment to define a local reference frame;

mounting an optical tracking device to the mobile object, the optical tracking device comprising one or more direction sensors that are arranged to detect visible reference targets and generate direction information relating to the direction of the visible reference targets relative to the optical tracking device;

operating the optical tracking device to track and sense visible reference targets as it moves with the mobile object in the environment and generate continuously updated direction information; and processing the direction information to: initially determine the 3D positions of the reference targets relative to each other within the local reference frame by auto-calibrating; and then subsequently generate updated position and orientation information relating to the current position and orientation of the mobile object in the local reference frame during movement of the mobile object based on the continuously updated direction information and the determined 3D positions of the reference targets.

11. A method of sensing the position and orientation of a mobile object according to claim 10 wherein the step of auto-calibrating comprises:

moving the mobile object into N locations in the environment and sensing direction information for visible reference targets at each location;

calculating initial estimates of the position and orientation of the mobile object at the N locations;

calculating accurate estimates of the position and orientation of the mobile object; and reconstructing the reference target 3D positions by triangulation using the direction information and the accurate estimates of the position and orientation of the mobile object.

12. A method of sensing the position and orientation of a mobile object according to claim 11 wherein the step of calculating initial estimates comprises executing a closed form algorithm.

13. A method of sensing the position and orientation of a mobile object according to claim 11 wherein the step of calculating accurate estimates comprises executing a non-linear minimisation algorithm.

14. A method of sensing the position and orientation of a mobile object according to claim 10 wherein the step of auto-calibrating occurs periodically to register the movement, removal, and addition of reference targets.

15. A method of sensing the position and orientation of a mobile object according to claim 10 further comprising the step of feeding back information on the quality of the distribution of the reference targets within the environment after the auto-calibration step has taken place, the distribution of the reference targets affecting the accuracy of the position and orientation information generated.

16. A method of sensing the position and orientation of a mobile object according to claim 10 wherein the step of processing the direction information to generate updated position and orientation information comprises:

calculating an initial estimate of the position and orientation of the mobile object using a boot-strapping process;

predicting the current position and orientation of the mobile object based on previous position and orientation estimate;

associating the sensed direction information with specific individual reference target 3D positions; and updating the current position and orientation prediction using the individual reference target 3D positions and direction information.

17. A method of sensing the position and orientation of a mobile object according to claim 16 wherein the step of predicting the current position and orientation of the mobile object comprises extrapolating from the previous position and orientation estimate.

18. A method of sensing the position and orientation of a mobile object according to claim 16 wherein the step of updating the current position and orientation predication comprising executing a non-linear algorithm.

19. A method of sensing the position and orientation of a mobile object according to claim 10 further comprising mounting an inertial sensor to the mobile object and operating the inertial sensor to sense the position and orientation of the mobile object and generate representative position and orientation information if the optical tracking device experiences target dropout.

* * * * *

UNITED STATES PATENT AND TRADEMARK OFFICE
CERTIFICATE OF CORRECTION

PATENT NO.       : 8,625,854 B2                                          Page 1 of 1
APPLICATION NO.  : 12/066108
DATED            : January 7, 2014
INVENTOR(S)      : Valkenburg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1673 days.

Signed and Sealed this
Twenty-second Day of September, 2015

Michelle K. Lee
*Director of the United States Patent and Trademark Office*